United States Patent
Boone et al.

(10) Patent No.: US 11,880,668 B2
(45) Date of Patent: Jan. 23, 2024

(54) DYNAMICALLY ALTERING A CODE EXECUTION WORKFLOW DURING DEVELOPMENT USING AUGMENTED REALITY

(71) Applicant: International Business Machines Corporation, Armonk, NY (US)

(72) Inventors: Michael Boone, Lutz, FL (US); Tushar Agrawal, West Fargo, ND (US); Atul Mene, Morrisville, NC (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 17/806,520

(22) Filed: Jun. 13, 2022

(65) Prior Publication Data

US 2023/0401040 A1    Dec. 14, 2023

(51) Int. Cl.
*G06F 8/34*    (2018.01)
*G06T 19/00*    (2011.01)
*G06F 8/72*    (2018.01)

(52) U.S. Cl.
CPC .............. *G06F 8/34* (2013.01); *G06F 8/72* (2013.01); *G06T 19/006* (2013.01)

(58) Field of Classification Search
CPC ..... G06F 8/34; G06F 8/30; G06F 8/72; G06T 19/006
See application file for complete search history.

(56) References Cited

U.S. PATENT DOCUMENTS

| | | |
|---|---|---|
| 9,390,260 B2 | 7/2016 | Tan |
| 10,365,985 B2 | 7/2019 | Wagner |
| 10,379,849 B1 | 8/2019 | Jasinski |
| 10,635,415 B2 | 4/2020 | Soeder |

(Continued)

FOREIGN PATENT DOCUMENTS

CN    116627481 A    *    8/2023

OTHER PUBLICATIONS

Semen Polonskii, "Dynamic representation of factory objects in a virtual reality environment" (Year: 2021).*

(Continued)

*Primary Examiner* — Phillip H Nguyen
(74) *Attorney, Agent, or Firm* — Edward P. Li

(57) ABSTRACT

A computer-implemented method, a computer program product, and a computer system for dynamically altering a code execution workflow using augmented reality (AR). A computer receives, from an AR device of a user, virtual modification of a source code, where the user virtually alters the source code on the augmented realty device. A computer generates an altered execution workflow, based on a virtually altered source code created in the virtual modification. A computer overlays the altered execution workflow on the AR device. A computer executes the altered execution workflow, in response to receiving from the AR device a user request for testing the virtually altered source code. A computer displays on the augmented realty device a result of executing the altered execution workflow. A computer physically alters the source code according to the virtually altered source code, in response to receiving from the AR device satisfactory user feedback about the result.

20 Claims, 9 Drawing Sheets

(56) References Cited

U.S. PATENT DOCUMENTS

| | | | |
|---|---|---|---|
| 11,693,653 B2* | 7/2023 | Hori | G06F 1/163 |
| | | | 717/123 |
| 2014/0359573 A1 | 12/2014 | Ajith Kumar | |
| 2015/0310497 A1* | 10/2015 | Valin | H04L 51/08 |
| | | | 705/14.66 |
| 2017/0109933 A1* | 4/2017 | Voorhees | G06F 11/36 |
| 2018/0121315 A1* | 5/2018 | Abadi | G06F 8/71 |
| 2018/0329804 A1 | 11/2018 | Conversy | |
| 2019/0303110 A1 | 10/2019 | Brude | |
| 2020/0357183 A1 | 11/2020 | Weber | |
| 2021/0096543 A1* | 4/2021 | Stump | G06F 8/34 |

OTHER PUBLICATIONS

Almohammadi et al., "Making the Invisible Visible: Real-Time Feedback for Embedded Computing Learning Activity Using Pedagogical Virtual Machine with Augmented Reality" (Year: 2018).*

Milovanovic et al., "Virtual and Augmented Reality in Architectural Design and Education" (Year: 2017).*

Schreiber et al., "Visualization of Software Architectures in Virtual Reality and Augmented Reality" (Year: 2019).*

Guo et al., "Codechella: Multi-User Program Visualizations for Real-Time Tutoring and Collaborative Learning," 2015 IEEE Symposium on Visual Languages and Human-Centric Computing (VL/HCC), 2015, 9 pages.

Shizue et al., "PVC.js: visualizing C programs on web browsers for novices," Heliyon, 6(4), e03806, 2020, 15 pages.

Mell et al., "The NIST Definition of Cloud Computing", NIST National Institute of Standards and Technology U.S. Department of Commerce, Special Publication 800-145, Sep. 2011, 7 pages.

* cited by examiner

DYNAMICALLY ALTERING A CODE EXECUTION WORKFLOW DURING DEVELOPMENT USING AUGMENTED REALITY

BACKGROUND

The present invention relates generally to augmented reality used in development of a source code, and more particularly to dynamically altering a code execution workflow during development using augmented reality.

In computing, a source code is any collection of codes, possibly with comments. A source code is written using a human-readable programming language, usually as plain text. A source code of a program is specially designed to facilitate the work of computer programmers. A source code is often transformed by an assembler or compiler into a binary machine code that can be executed by a computer. The binary machine code may then be stored for execution at a later time. Alternatively, a source code may be interpreted and immediately executed. When any source code file is created, then the same source code is executed in sequence as per the logic written in the source code. In many situations, a source code is copied from another source code, and during testing a developer views how the source code is executed and views a query plan or code execution flow. A query plan or code execution flow is a set of steps that a code block is executed in order to complete a query. In many situations, while developing a source code, a developer may want to copy and paste a code block from Internet search or another source code, and a developer may check the functionality to determine whether the source code works.

SUMMARY

In one aspect, a computer-implemented method for dynamically altering an execution workflow using augmented reality is provided. The computer-implemented method includes receiving, from an augmented realty device of a user, virtual modification of a source code, where the user virtually alters the source code on the augmented realty device. The computer-implemented method further includes generating an altered execution workflow, based on a virtually altered source code created in the virtual modification. The computer-implemented method further includes overlaying the altered execution workflow on the augmented realty device. The computer-implemented method further includes executing the altered execution workflow, in response to receiving from the augmented realty device a user request for testing the virtually altered source code. The computer-implemented method further includes displaying, on the augmented realty device, a result of executing the altered execution workflow. The computer-implemented method further includes, in response to receiving from the augmented realty device satisfactory user feedback about the result, physically altering the source code according to the virtually altered source code.

In another aspect, a computer program product for dynamically altering an execution workflow using augmented reality is provided. The computer program product comprises a computer readable storage medium having program instructions embodied therewith, and the program instructions are executable by one or more processors. The program instructions are executable to: receive, from an augmented realty device of a user, virtual modification of a source code, where the user virtually alters the source code on the augmented realty device; generate an altered execution workflow, based on a virtually altered source code created in the virtual modification; overlay the altered execution workflow on the augmented realty device; execute the altered execution workflow, in response to receiving from the augmented realty device a user request for testing the virtually altered source code; display, on the augmented realty device, a result of executing the altered execution workflow; and physically alter the source code according to the virtually altered source code, in response to receiving from the augmented realty device satisfactory user feedback about the result.

In yet another aspect, a computer system for dynamically altering an execution workflow using augmented reality is provided. The computer system comprises one or more processors, one or more computer readable tangible storage devices, and program instructions stored on at least one of the one or more computer readable tangible storage devices for execution by at least one of the one or more processors. The program instructions are executable to receive, from an augmented realty device of a user, virtual modification of a source code, where the user virtually alters the source code on the augmented realty device. The program instructions are further executable to generate an altered execution workflow, based on a virtually altered source code created in the virtual modification. The program instructions are further executable to overlay the altered execution workflow on the augmented realty device. The program instructions are further executable to execute the altered execution workflow, in response to receiving from the augmented realty device a user request for testing the virtually altered source code. The program instructions are further executable to display, on the augmented realty device, a result of executing the altered execution workflow. The program instructions are further executable to physically alter the source code according to the virtually altered source code, in response to receiving from the augmented realty device satisfactory user feedback about the result.

DETAILED DESCRIPTION

Figure 1:
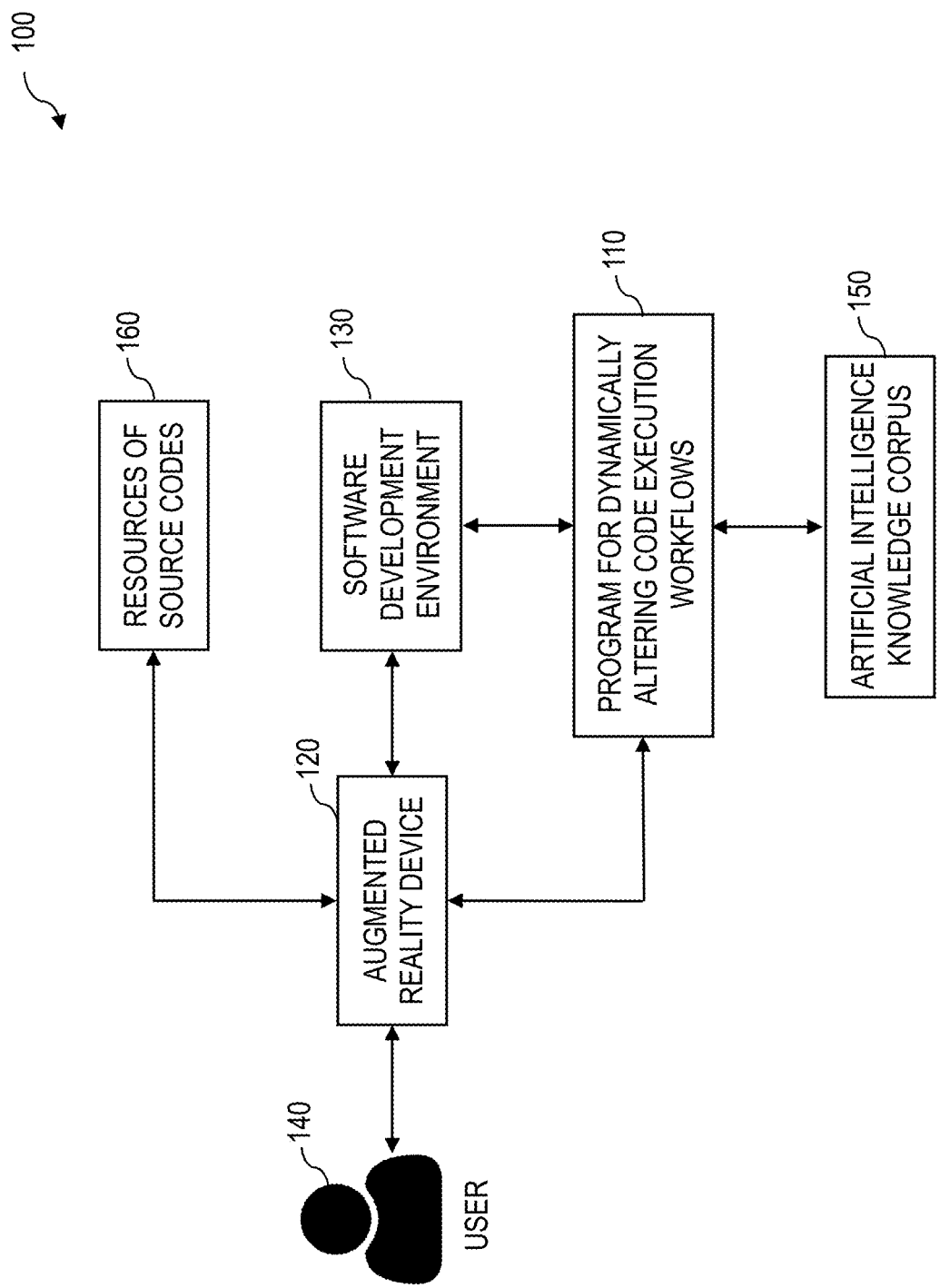
FIG. 1 is a systematic diagram illustrating a system for dynamically altering a code execution workflow using augmented reality, in accordance with one embodiment of the present invention.

Embodiments of the present invention disclose a system for dynamically altering a code execution sequence during development using augmented reality. In embodiments of the present invention, on an augmented reality (AR) device (e.g., an AR glasses, an AR monitor, an AR enabled mobile phone), a developer alters a code execution workflow by virtually adding one or more code blocks into a source code and/or virtually removing one or more code blocks from a source code, and accordingly a virtually altered source code will be executed as per an altered query created on the AR device. Upon satisfactory completion of the testing, the source code is dynamically assembled based on the altered code execution workflow.

In embodiments of the present invention, a code execution workflow can be observed by using an AR device. When a computer source code is developed, a user or developer uses an AR device to visualize an execution workflow of the source code. Furthermore, with a visual interface of an AR device, the user or developer alters the execution workflow of the source code.

In embodiments of the present invention, a code execution workflow can be altered by using an AR overlay without physically modifying a source code. When an execution workflow of a source code is altered with an AR device, a user or developer points to one or more code blocks in same or different code and accordingly a new workflow sequence is created without physically altering the code.

In embodiments of the present invention, one or more code snippets can be inserted by using an AR device. When an execution workflow of a source code is altered with an AR device, a user or developer inserts one or more code snippets from Internet search and another running application code file, and a user or developer may also add one or more conditions using an AR device; therefore, the source code will be executed with an altered workflow sequence.

In embodiments of the present invention, multiple workflow sequences for different code paths can be generated for comparison between different code paths. A user or developer may use an AR device to create multiple workflow sequences of different code paths, and different workflow sequences will create different types of execution. Thus, a user or developer can analyze the comparison of different workflows with different code snippets.

In embodiments of the present invention, upon satisfactory completion of the a code execution with an altered workflow sequence created by using an AR device, the disclosed system can dynamically modify a source code as per the altered workflow sequence and deploy a physically altered source code.

In embodiments of the present invention, the disclosed system receives a feed from an AR device to identify an altered execution workflow. Accordingly, the disclosed system identifies a selected code snippet and a position in an execution sequence, and the disclosed system creates a virtual compilation that will execute a virtually altered source code without changing a source code physically.

In embodiments of the present invention, the disclosed system receives simultaneous collaborations among multiple users using respective AR devices. In the collaborations, isolated workloads are presented to each of the multiple users. A collaboration beehive can spawn sub-hives for a targeted collaboration; this will allow for remote collaboration without being collocated.

FIG. 1 is a systematic diagram illustrating system 100 for dynamically altering a code execution workflow using augmented reality, in accordance with one embodiment of the present invention. System 100 includes program 110 for dynamically altering code execution workflows. System 100 further includes augmented reality device 120 used by user (or software developer) 140. For example, augmented reality device 120 may be an augmented reality glasses, an augmented reality monitor, or an augmented reality enabled mobile phone. System 100 further includes software development environment 130 (e.g., an integrated development environment (IDE)). Augmented reality device 120 is paired with program 110 and software development environment 130.

On augmented reality device 120, program 110 displays a source code written in software development environment 130. Program 110 generates an execution workflow of the source code and further overlays the execution workflow on augmented reality device 120. By using augmented reality device 120, user 140 is capable of viewing the source code and the overlaid execution workflow. By using augmented reality device 120, user 140 is capable of virtually altering the source code, either virtually adding source code blocks to the source code or virtually removing source code blocks from the source code. When user 140 virtually alters the source code, the source code in software development environment 130 is not physically altered or modified. Upon receiving from augmented reality device 120 the user's virtual modification of the source code, program 110 generates an altered execution workflow based on a virtually altered source code created in the virtual modification and further overlays the altered execution workflow on augmented reality device 120.

In respond to receiving, from user 140 via augmented reality device 120, a request for testing the virtually altered source code, program 110 will execute the altered execution workflow. In another embodiment, software development environment 130 may execute the altered execution workflow. Program 110 or software development environment 130 presents a result of execution of the altered execution workflow to user 140, through augmented reality device 120.

Upon viewing the execution result on augmented reality device 120, user 140 uses augmented reality device 120 to provide user feedback about the execution result. If user 140 is satisfied with the result of the execution, program 110 may cause software development environment 130 to physically alter the source code. If user 140 is not satisfied with the result of the execution, the source code written in software development environment 130 will not be physically altered or modified; in other words, the source code in software development environment 130 will be kept unchanged.

Program 110 and software development environment 130 are implemented in one or more computing devices or servers. A computing device or server may be any electronic device or computing system capable of receiving input from a user, executing computer program instructions, and communicating with another computing system via a network. A computing device or server is described in more detail in later paragraphs with reference to FIG. 4. System 100 may be implemented in a cloud computing environment. The cloud computing environment is described in more detail in later paragraphs with reference to FIG. 5 and FIG. 6.

In some embodiments, program 110 may be a standalone program, independent of software development environment 130. In some other embodiments, program 110 may be an add-on program to software development environment 130.

System 100 further includes resources 160 of source codes. During altering the source code, using augmented reality device 120, user 140 searches resources 160 to identify one or more code components in other software applications. In searching resources 160, user 140 may identify one or more code components in other software applications that are available in a network such as Internet. In searching resources 160, user 140 may identify one or more code components in other code files.

System 100 further includes artificial intelligence (AI) knowledge corpus 150. In response to receiving user feedback about a result of executing the altered execution workflow, program 110 stores, in AI knowledge corpus 150, information about the virtually altered source code and the altered execution workflow. Program 110 will be trained through machine learning, using the information stored in AI knowledge corpus 150.

Figure 2A:
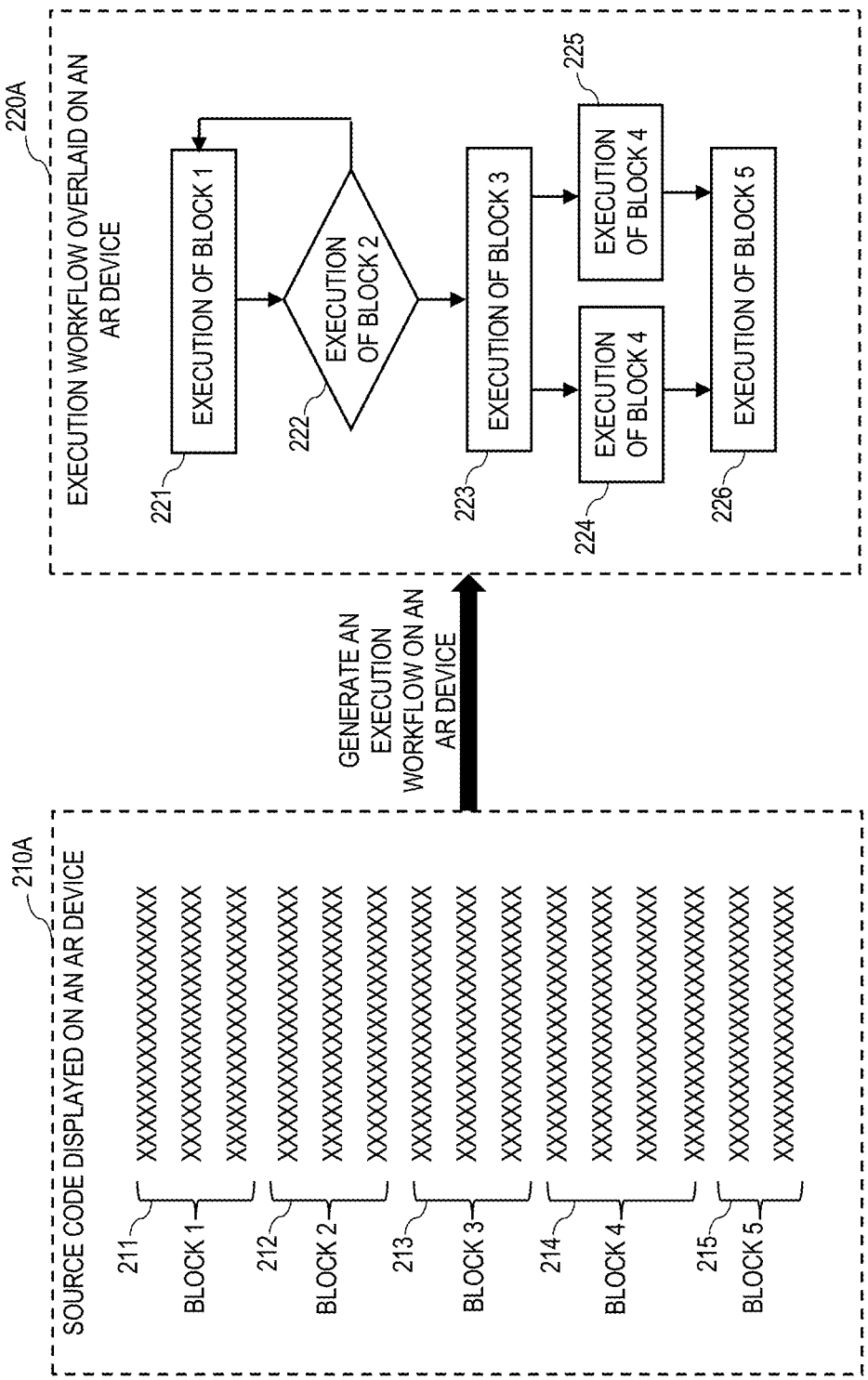
FIG. 2(A) illustrates an example of generating an execution workflow of a source code, in accordance with one embodiment of the present invention.

FIG. 2(A) illustrates an example of generating an execution workflow of a source code, in accordance with one embodiment of the present invention. FIG. 2(A) illustrates source code 210A on an augmented reality (AR) device (such as augmented reality device 120 shown in FIG. 1). As an example, source code 210A includes block 1 211, block 2 212, block 3 213, block 4 214, and block 5 215. A program (such as program 110) for dynamically altering code execution workflows generates execution workflow 220A of source code 210A. Execution workflow 220A is overlaid on the AR device. As an example, execution workflow 220A is executed in this sequence: execution 221 of block 1, execution 222 of block 2, execution 223 of block 3, execution 224 of block 4 and execution 225 of block 4, and execution 226 of block 5.

Figure 2B:
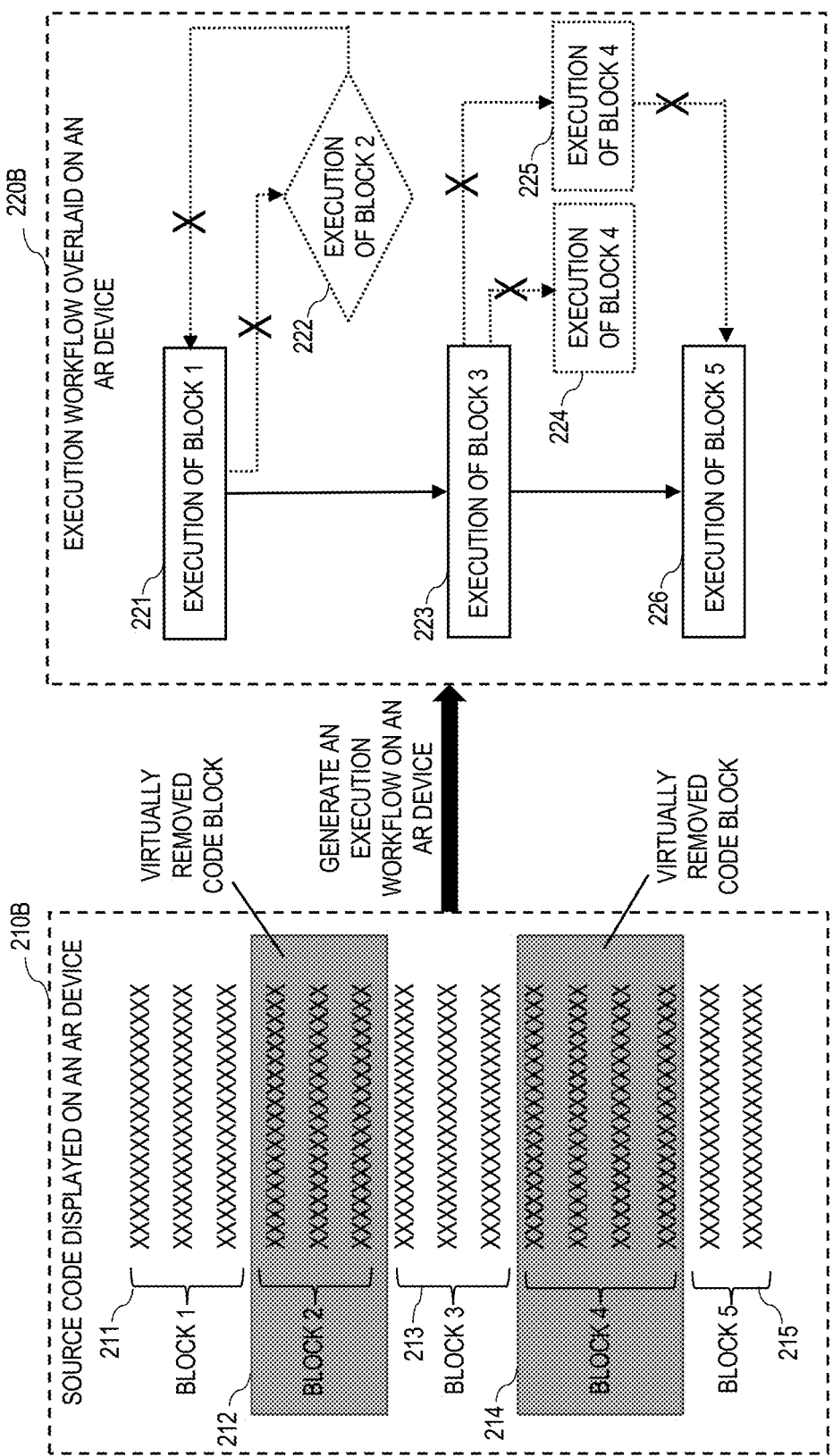
FIG. 2(B) illustrates an example of generating an execution workflow of a source code from which source code blocks are virtually removed by a user using augmented reality, in accordance with one embodiment of the present invention.

FIG. 2(B) illustrates an example of generating an execution workflow of a source code from which source code blocks are virtually removed by a user using augmented reality, in accordance with one embodiment of the present invention. On an augmented reality (AR) device (such as augmented reality device 120 shown in FIG. 1), a user or software developer (such as user 140 shown in FIG. 1) virtually alters source code 210A illustrated in FIG. 2(A). FIG. 2(B) illustrates source code 210B on an AR device, and source code 210B indicates the virtual modification of source code 210A. In the virtual modification, the user or software developer virtually removes block 2 212 and block 4 214. A program (such as program 110) for dynamically altering code execution workflows generates execution workflow 220B, based on a virtually altered source code which is created in the virtual modification of the source code. Execution workflow 220B is overlaid on the AR device. As an illustrated example, execution workflow 220B is executed in this sequence: execution 221 of block 1, execution 223 of block 3, and execution 225 of block 5. In execution workflow 220B, execution 222 of block 2, execution 224 of block 4, and execution 225 of block 4 are not executed.

Figure 2C:
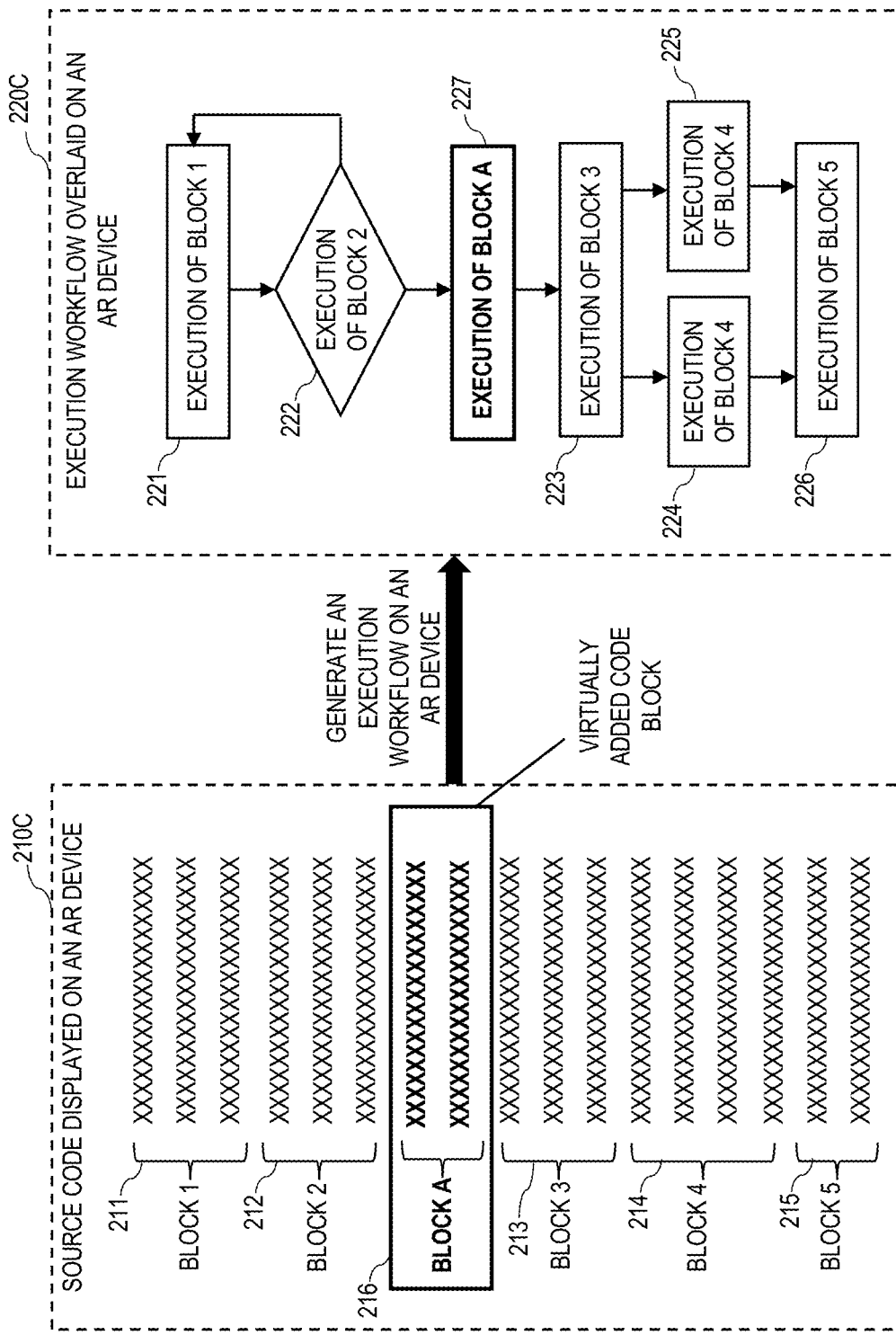
FIG. 2(C) illustrates an example of generating an execution workflow of a source code to which a source code block is virtually added by a user using augmented reality, in accordance with one embodiment of the present invention.

FIG. 2(C) illustrates an example of generating an execution workflow of a source code to which a source code block is virtually added by a user using augmented reality, in accordance with one embodiment of the present invention. On an augmented realty (AR) device (such as augmented reality device 120 shown in FIG. 1), a user or software developer (such as user 140) virtually alters source code 210A shown in FIG. 2(A). FIG. 2(C) illustrates source code 210C on the AR device, and source code 210C indicates the virtual modification of source code 210A. In the virtual modification, the user or software developer virtually adds block A 216 between block 2 212 and block 3 213. When the user or software developer adds block A 216, the user or software developer may use the AR device to search resources of source codes (such as resources 160 shown in FIG. 1) to identify one or more code components in other software applications. The user or software developer may identify one or more code components in other software applications that are available in a network such as Internet or identify one or more code components in other code files. A program (such as program 110) for dynamically altering code execution workflows generates execution workflow 220C, based on a virtually altered source code which is created in the virtual modification of the source code. Execution workflow 220C is overlaid on the AR device. As an illustrated example, execution workflow 220C is executed in this sequence: execution 221 of block 1, execution 222 of block 2, execution 227 of block A, execution 223 of block 3, execution 224 of block 4 and execution 225 of block 4, and execution 226 of block 5.

Figure 3A:
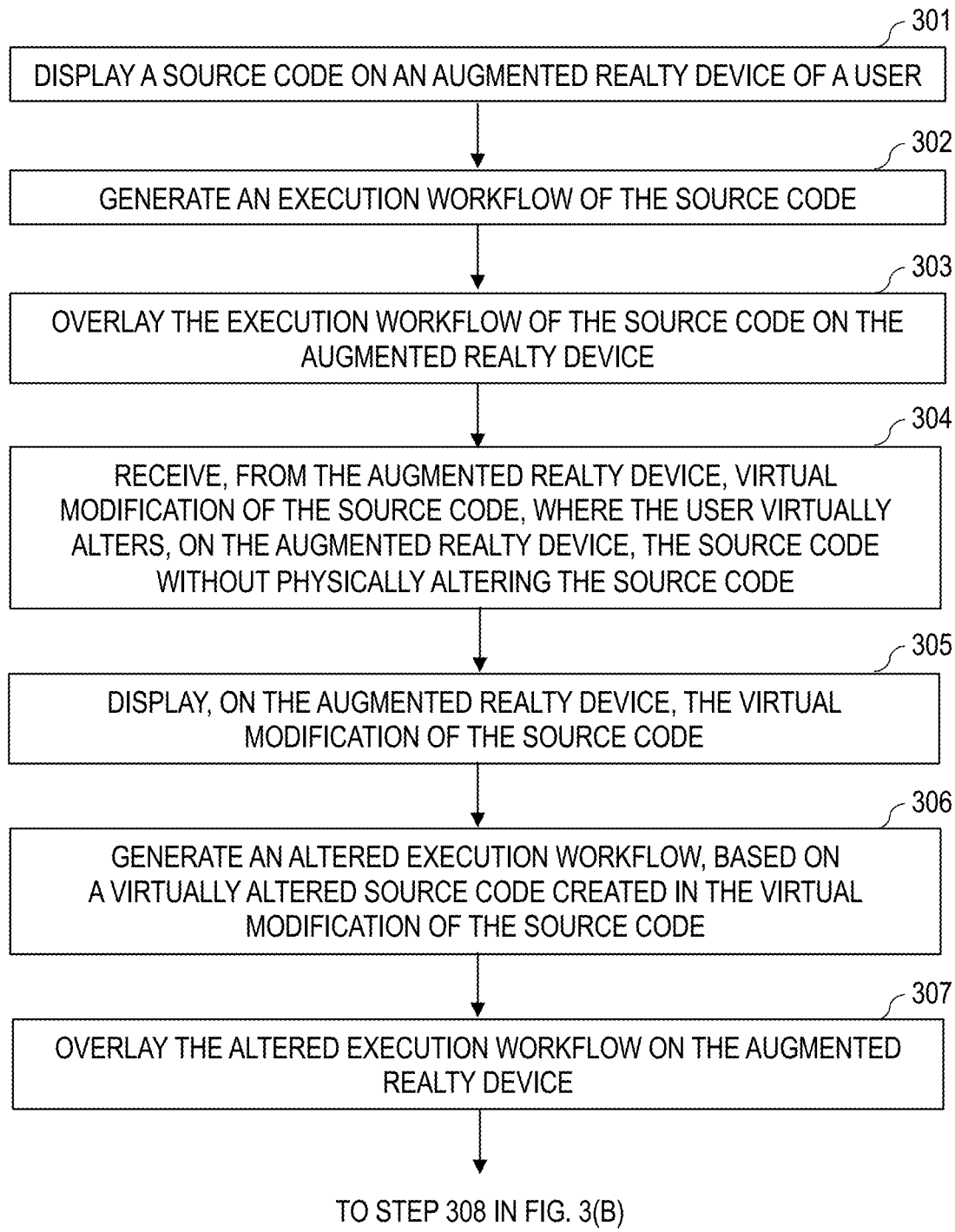
FIG. 3(A) and FIG. 3(B) present a flowchart showing operational steps of dynamically altering an execution workflow using augmented reality, in accordance with one embodiment of the present invention.
Figure 3B:
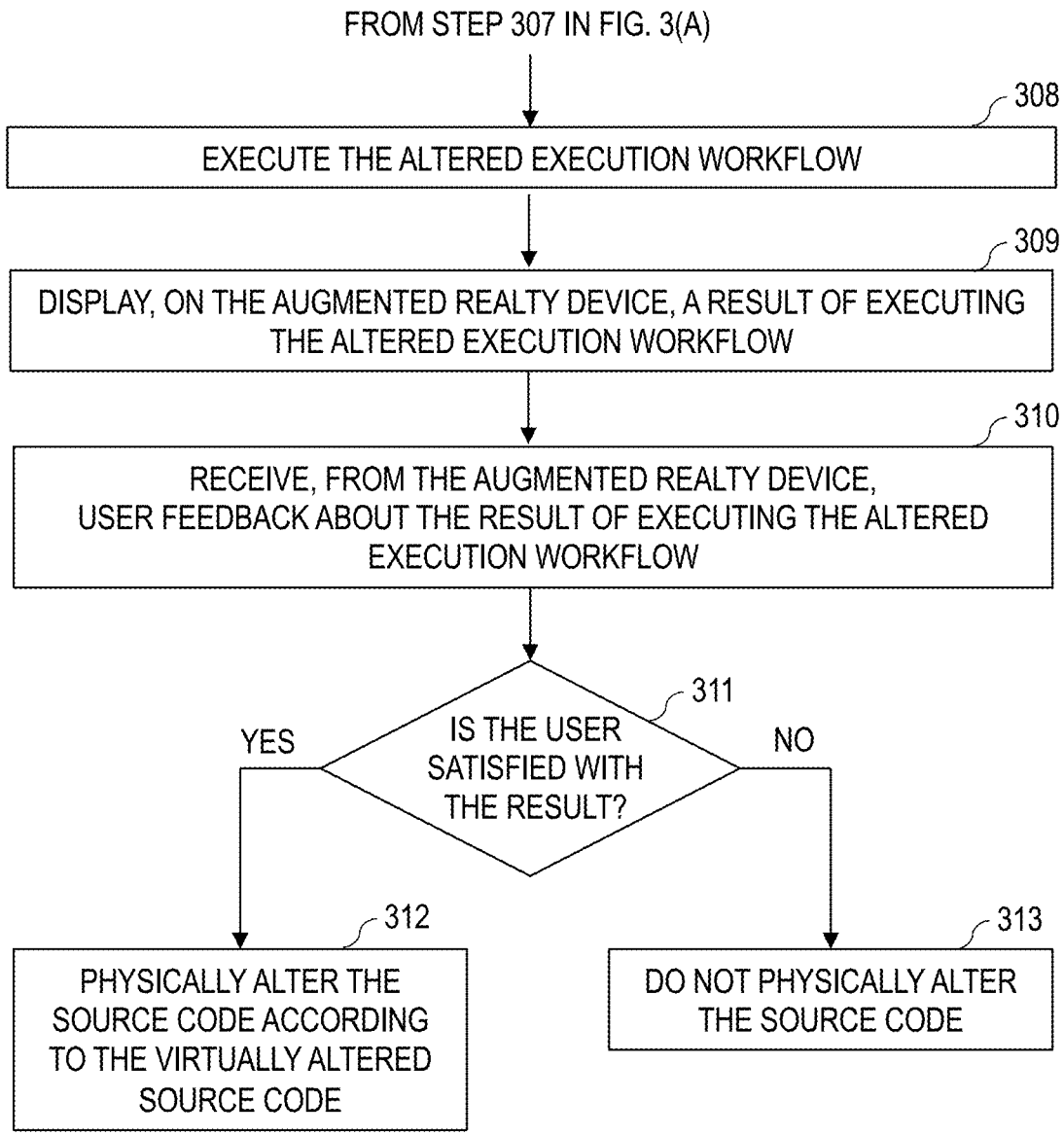

FIG. 3(A) and FIG. 3(B) present a flowchart showing operational steps of dynamically altering an execution workflow using augmented reality, in accordance with one embodiment of the present invention. The operational steps are implemented on one or more computing devices or servers. A computing device or server is described in more detail in later paragraphs with reference to FIG. 4. The operational steps may be implemented in a cloud computing environment. The cloud computing environment is described in more detail in later paragraphs with reference to FIG. 5 and FIG. 6.

Referring to FIG. 3(A), at step 301, the one or more computing devices or servers display a source code on an augmented realty device of a user. For example, referring to FIG. 1 and FIG. 2(A), program 110 displays source code 210A (which is written in software development environment 130) on augmented reality device 120 used by user 140. User 140 views source code 210A on augmented reality device 120.

Referring to FIG. 3(A), at step 302, the one or more computing devices or servers generate an execution workflow of the source code. The one or more computing devices or servers identify the logic of the source code and create the execution workflow. For example, referring to FIG. 1 and FIG. 2(A), program 110 generates execution workflow 220A of source code 210A.

Referring to FIG. 3(A), at step 303, the one or more computing devices or servers overlay the execution workflow of the source code on the augmented realty device. Upon the execution workflow of the source code being generated at step 302, the execution workflow is overlaid on the augmented realty device used by the user or developer; therefore, the user or developer can view how the source code is executed. For example, referring to FIG. 1 and FIG. 2(A), program 110 overlays execution workflow 220A on augmented reality device 120. User 140 uses augmented reality device 120 to view execution workflow 220A overlaid on augmented reality device 120.

Referring to FIG. 3(A), at step 304, the one or more computing devices or servers receive, from the augmented realty device, virtual modification of the source code, where the user virtually alters, on the augmented realty device, the source code without physically altering the source code. For example, the user may use a finger-based interaction with the augmented realty device to alters the source code. While altering the one or more code blocks of the source code displayed on the augmented realty device, the user does not perform any physical change in the source code written in a software development environment. The user may alter the source code by virtually removing from the source code and/or adding code blocks to the source code (each block includes one or more lines of the source code). For example, referring to FIG. 1, on augmented reality device 120, user 140 virtually alters the source code. As shown in FIG. 2(B), the user or software developer virtually removes two code blocks (block 2 212 and block 4 214) from the source code. As shown in FIG. 2(C), the user or software developer virtually adds one code block (block A 216).

Referring to FIG. 3(A), at step 305, the one or more computing devices or servers display, on the augmented realty device, the virtual modification of the source code. In the source code shown on the augmented reality device, the one or more computing devices or servers indicate one or more virtually altered code blocks. On the augmented realty device, the one or more computing devices or servers indicate which code blocks are virtually altered in the source code; for example, the one or more computing devices or servers indicate which code blocks are virtually removed or added. For example, referring to FIG. 1 and FIG. 2(B), on augmented reality device 120, program 110 indicates virtually removed code blocks in the source code, i.e., block 2 212 and block 4 214. For example, referring to FIG. 1 and FIG. 2(C), on augmented reality device 120, program 110 indicates a virtually added code block in the source code, i.e., block A 216.

Referring to FIG. 3(A), at step 306, the one or more computing devices or servers generate an altered execution workflow, based on a virtually altered source code created in the virtual modification of the source code. The one or more computing devices or servers identify the logic of the virtually altered source code and create the altered execution workflow. For example, referring to FIG. 1 and FIG. 2(B), on augmented reality device 120, program 110 generates execution workflow 220B of the virtually altered source code; in execution workflow 220B, executions of the virtually removed code blocks (execution 224 of block 4 and execution 225 of block 4) are skipped. For example, referring to FIG. 1 and FIG. 2(C), on augmented reality device 120, program 110 generates execution workflow 220C of the virtually altered source code; in execution workflow 220C, the execution of the virtually added code block (execution 227 of block A) is added into the original execution workflow.

Referring to FIG. 3(A), at step 307, the one or more computing devices or servers overlay the altered execution workflow on the augmented realty device. Therefore, the user (or software developer) can use the augmented reality device to view how the virtually altered source code is executed. For example, referring to FIG. 1, FIG. 2(B), and FIG. 2(C), program 110 overlays execution workflow 220B and/or execution workflow 220C on augmented reality device 120 used by user 140.

Referring to FIG. 3(B), at step 308, the one or more computing devices or servers execute the altered execution workflow. Upon a user's request for testing the virtually altered source code being received from the augmented realty device, the altered execution workflow is executed. The user may use a finger-based interaction with the augmented realty device to make the request. For example, referring to FIG. 1, FIG. 2(B), and FIG. 2(C), in some embodiments, program 110 may execute execution workflow 220B and/or execution workflow 220C; in some other embodiments, software development environment 130 may execute execution workflow 220B and/or execution workflow 220C.

Referring to FIG. 3(B), at step 309, the one or more computing devices or servers display, on the augmented realty device, a result of executing the altered execution workflow. The user uses the augmented realty device to view the result of executing the altered execution workflow. For example, referring to FIG. 1, on augmented reality device 120, program 110 or software development environment 130 presents the result to user 140.

Referring to FIG. 3(B), at step 310, the one or more computing devices or servers receive, from the augmented realty device, user feedback about the result of executing the altered execution workflow. For example, the user (or software developer) may use a finger-based interaction with the augmented realty device to provide the feedback. For example, referring to FIG. 1, program 110 receives the user feedback from augmented realty device 120 used by user 140.

At step 311, the one or more computing devices or servers determines whether the user is satisfied with the result of executing the altered execution workflow. In response to determining that the user is satisfied with the result or in response to receiving from the augmented realty device satisfactory user feedback about the result (YES branch of decision block 311), at step 312, the one or more computing devices or servers physically alter the source code according to the virtually altered source code. If the result is satisfactory, then the user confirms the new execution workflow and the one or more computing devices or servers update the source code as per new execution workflow (or the altered execution workflow). For example, referring to FIG. 1, program 110 may cause software development environment 130 to physically alter the source code.

In response to determining that the user is not satisfied with the result or in response to receiving from the augmented realty device dissatisfactory user feedback about the result (NO branch of decision block 311), at step 313, the one or more computing devices or servers do not physically alter the source code or perform no physical alteration of the source code. The current virtual modification of the source code may abandoned and the source code may be maintained the same.

Figure 4:
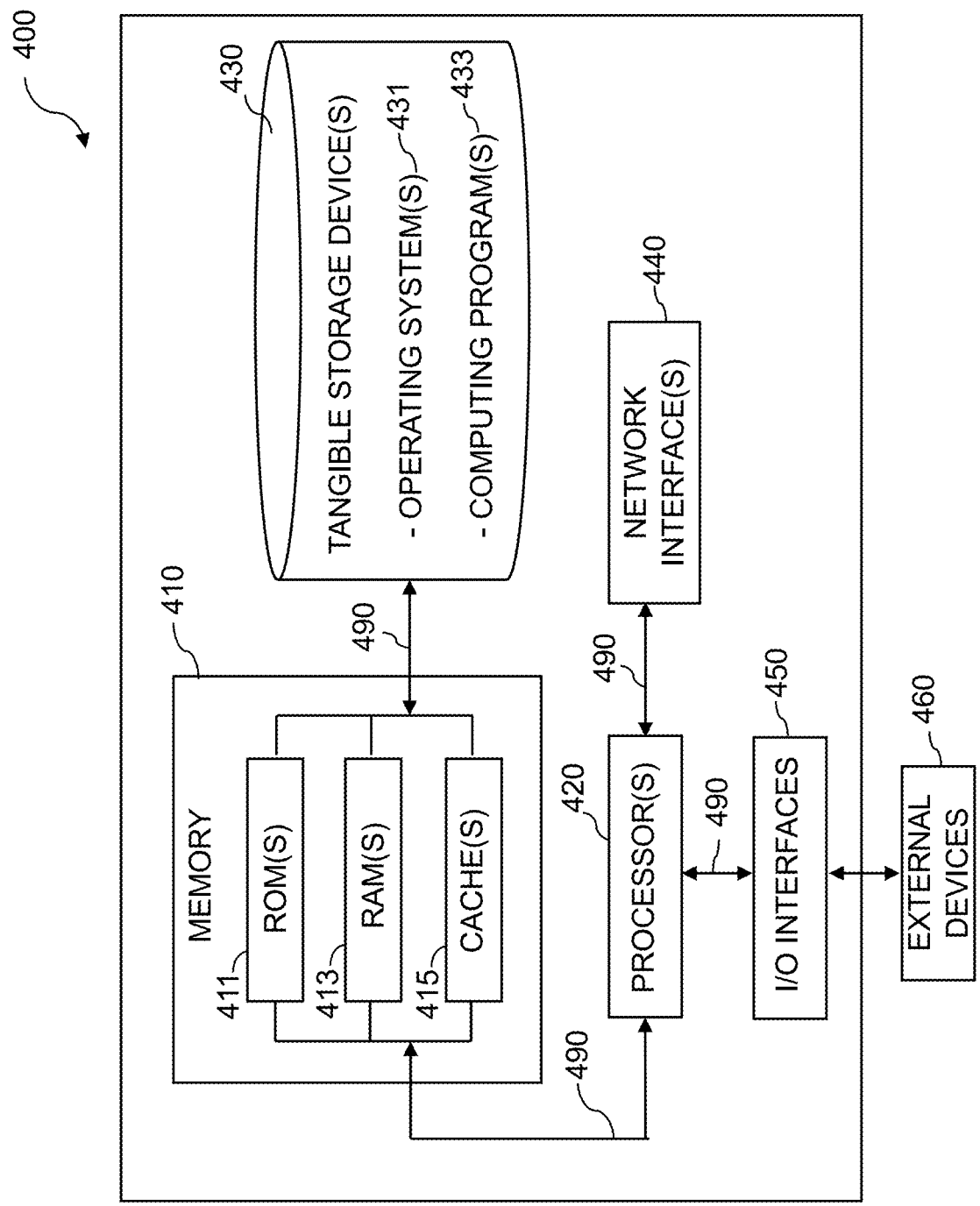
FIG. 4 is a diagram illustrating components of a computing device or server, in accordance with one embodiment of the present invention.

FIG. 4 is a diagram illustrating components of a computing device or server, in accordance with one embodiment of the present invention. It should be appreciated that FIG. 4 provides only an illustration of one implementation and does not imply any limitations; different embodiments may be implemented.

Referring to FIG. 4, computing device or server 400 includes processor(s) 420, memory 410, and tangible storage device(s) 430. In FIG. 4, communications among the above-mentioned components of computing device or server 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device or server 400 further includes I/O interface(s) 450. I/O interface(s) 450 allows for input and output of data with external device(s) 460 that may be connected to computing device or server 400. Computing device or server 400 further includes network interface(s) 440 for communications between computing device or server 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
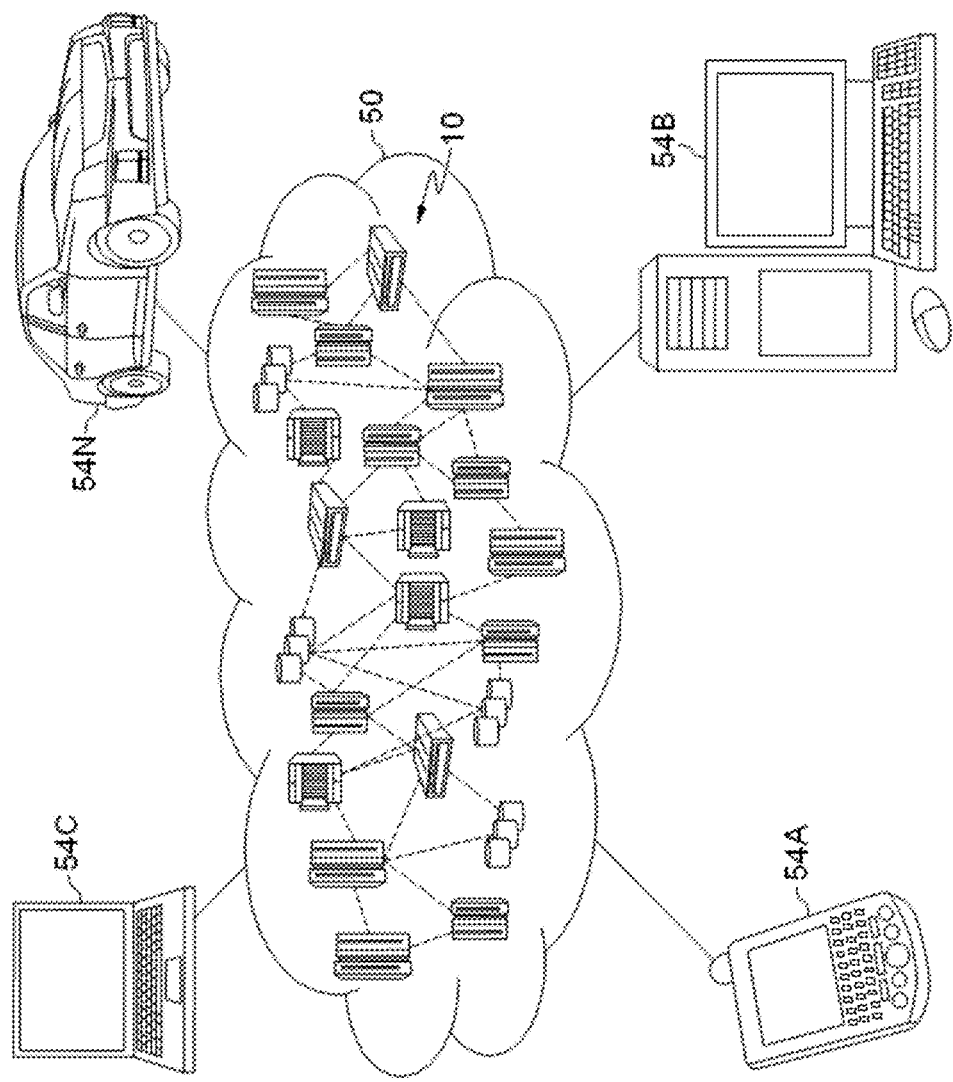
FIG. 5 depicts a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 6:
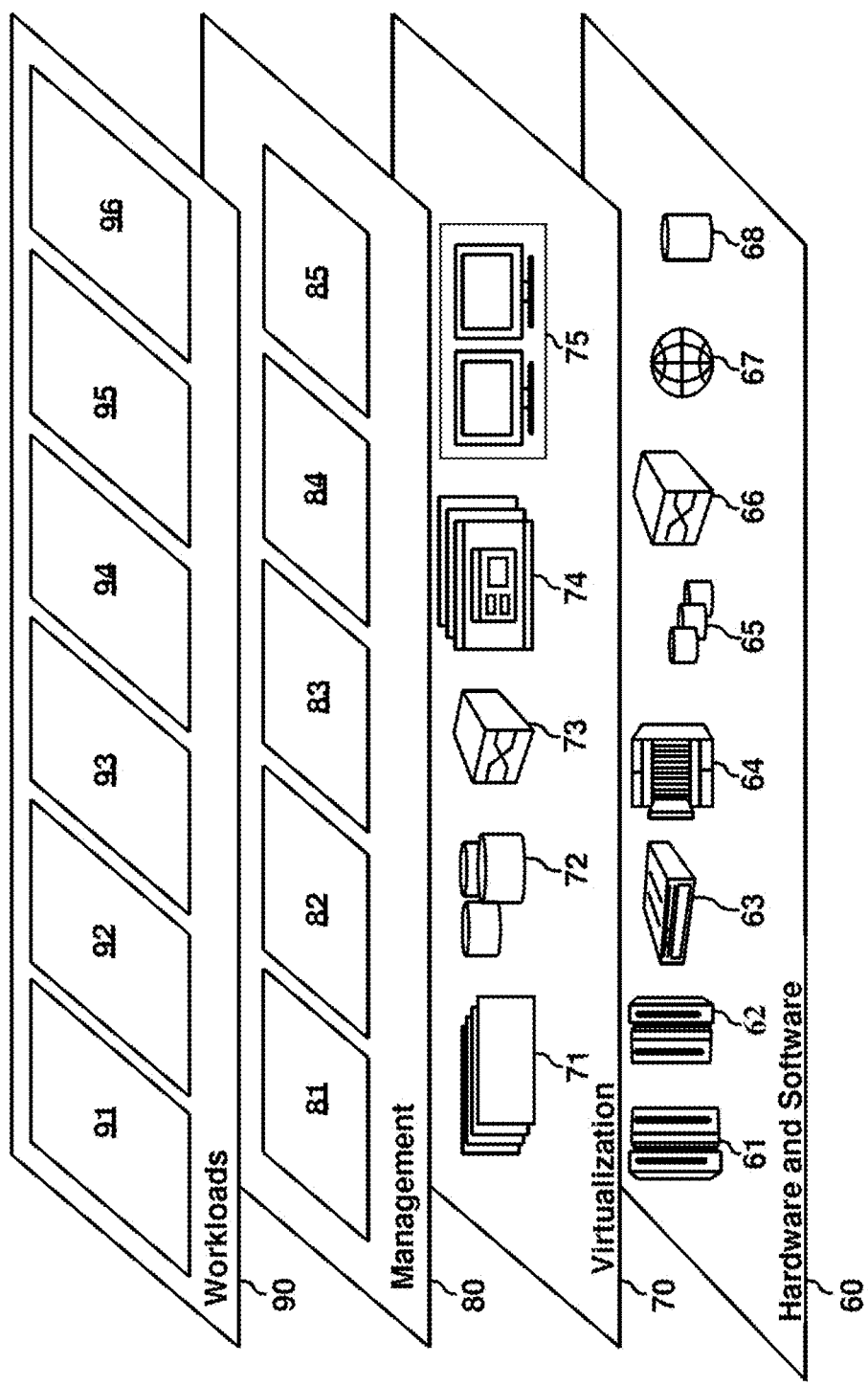
FIG. 6 depicts abstraction model layers in a cloud computing environment, in accordance with one embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of dynamically altering a code execution workflow during development using augmented reality.

What is claimed is:

1. A computer-implemented method for dynamically altering an execution workflow using augmented reality, the method comprising:
   receiving, from an augmented realty device of a user, virtual modification of a source code, wherein the user virtually alters the source code on the augmented realty device;
   generating an altered execution workflow, based on a virtually altered source code created in the virtual modification;
   overlaying the altered execution workflow on the augmented realty device;
   executing the altered execution workflow, in response to receiving from the augmented realty device a user request for testing the virtually altered source code;
   displaying, on the augmented realty device, a result of executing the altered execution workflow; and
   in response to receiving from the augmented realty device satisfactory user feedback about the result, physically altering the source code according to the virtually altered source code.

2. The computer-implemented method of claim 1, further comprising:
   in response to receiving from the augmented realty device dissatisfactory user feedback about the result, performing no physical alteration of the source code.

3. The computer-implemented method of claim 1, further comprising:
   displaying, on the augmented realty device, the virtual modification; and
   wherein one or more virtually altered code blocks in the source code are indicated on the augmented realty device.

4. The computer-implemented method of claim 1, further comprising:
   displaying the source code on the augmented realty device;
   generating an execution workflow of the source code; and
   overlaying the execution workflow on the augmented realty device.

5. The computer-implemented method of claim 1, wherein, in virtually altering the source code, the user virtually removes, on the augmented realty device, one or more code blocks from the source code.

6. The computer-implemented method of claim 1, wherein, in virtually altering the source code, the user virtually adds, on the augmented realty device, one or more code blocks into the source code.

7. The computer-implemented method of claim 1, wherein, in virtually altering the source code, the source code is not physically altered.

8. A computer program product for dynamically altering an execution workflow using augmented reality, the computer program product comprising a computer readable storage medium having program instructions embodied therewith, the program instructions executable by one or more processors, the program instructions executable to:
   receive, from an augmented realty device of a user, virtual modification of a source code, wherein the user virtually alters the source code on the augmented realty device;
   generate an altered execution workflow, based on a virtually altered source code created in the virtual modification;
   overlay the altered execution workflow on the augmented realty device;
   execute the altered execution workflow, in response to receiving from the augmented realty device a user request for testing the virtually altered source code;
   display, on the augmented realty device, a result of executing the altered execution workflow; and
   in response to receiving from the augmented realty device satisfactory user feedback about the result, physically alter the source code according to the virtually altered source code.

9. The computer program product of claim 8, further comprising the program instructions executable to:
   in response to receiving from the augmented realty device dissatisfactory user feedback about the result, perform no physical alteration of the source code.

10. The computer program product of claim 8, further comprising the program instructions executable to:
    display, on the augmented realty device, the virtual modification; and
    wherein one or more virtually altered code blocks in the source code are indicated on the augmented realty device.

11. The computer program product of claim 8, further comprising the program instructions executable to:
    display the source code on the augmented realty device;
    generate an execution workflow of the source code; and
    overlay the execution workflow on the augmented realty device.

12. The computer program product of claim 8, wherein, in virtually altering the source code, the user virtually removes, on the augmented realty device, one or more code blocks from the source code.

13. The computer program product of claim 8, wherein, in virtually altering the source code, the user virtually adds, on the augmented realty device, one or more code blocks into the source code.

14. The computer program product of claim 8, wherein, in virtually altering the source code, the source code is not physically altered.

15. A computer system dynamically altering an execution workflow using augmented reality, the computer system comprising one or more processors, one or more computer readable tangible storage devices, and program instructions stored on at least one of the one or more computer readable tangible storage devices for execution by at least one of the one or more processors, the program instructions executable to:

receive, from an augmented realty device of a user, virtual modification of a source code, wherein the user virtually alters the source code on the augmented realty device;

generate an altered execution workflow, based on a virtually altered source code created in the virtual modification;

overlay the altered execution workflow on the augmented realty device;

execute the altered execution workflow, in response to receiving from the augmented realty device a user request for testing the virtually altered source code;

display, on the augmented realty device, a result of executing the altered execution workflow; and in response to receiving from the augmented realty device satisfactory user feedback about the result, physically alter the source code according to the virtually altered source code.

16. The computer system of claim 15, further comprising the program instructions executable to:

in response to receiving from the augmented realty device dissatisfactory user feedback about the result, perform no physical alteration of the source code.

17. The computer system of claim 15, further comprising the program instructions executable to:

display, on the augmented realty device, the virtual modification; and wherein one or more virtually altered code blocks in the source code are indicated on the augmented realty device.

18. The computer system of claim 15, further comprising the program instructions executable to:

display the source code on the augmented realty device;

generate an execution workflow of the source code; and overlay the execution workflow on the augmented realty device.

19. The computer system of claim 15, wherein, in virtually altering the source code, on the augmented realty device, the user virtually removes or adds one or more code blocks.

20. The computer system of claim 15, wherein, in virtually altering the source code, the source code is not physically altered.

* * * * *